US006529953B1

United States Patent
Van Renesse

(12) United States Patent
(10) Patent No.: US 6,529,953 B1
(45) Date of Patent: Mar. 4, 2003

(54) SCALABLE COMPUTER NETWORK RESOURCE MONITORING AND LOCATION SYSTEM

(75) Inventor: Robbert Van Renesse, Ithaca, NY (US)

(73) Assignee: Reliable Network Solutions, Ithaca, NY (US)

( * ) Notice: Subject to any disclaimer, the term of this patent is extended or adjusted under 35 U.S.C. 154(b) by 0 days.

(21) Appl. No.: 09/466,165

(22) Filed: Dec. 17, 1999

(51) Int. Cl.[7] .............................................. G06F 13/00
(52) U.S. Cl. ....................... 709/223; 707/100; 707/101; 707/1; 707/2; 709/200
(58) Field of Search ................................ 707/101, 100, 707/1, 2; 709/223, 224, 200

(56) References Cited

U.S. PATENT DOCUMENTS

| | | | | |
|---|---|---|---|---|
| 5,724,577 A | * | 3/1998 | Exley et al. ................. | 707/100 |
| 5,864,865 A | * | 1/1999 | Lakis ......................... | 707/103 |
| 5,974,407 A | * | 10/1999 | Sacks ............................ | 707/2 |
| 6,167,399 A | * | 12/2000 | Hoang ........................... | 707/5 |
| 6,272,537 B1 | * | 8/2001 | Kekic et al. ................. | 709/223 |
| 6,385,604 B1 | * | 5/2002 | Bakalash et al. ............. | 707/3 |
| 6,411,967 B1 | * | 6/2002 | Van Renesse ............... | 707/201 |
| 6,421,658 B1 | * | 7/2002 | Carey et al. .................... | 707/2 |

OTHER PUBLICATIONS

Aiken J A et al: "Achieving Interoperability with Distributed Relational Databases" IEEE Network, IEEE Inc. New York, US, vol. 5, No. 1, 1991, pp. 38–45.

\* cited by examiner

Primary Examiner—Kenneth R. Coulter
(74) Attorney, Agent, or Firm—Cesari and McKenna, LLP

(57) ABSTRACT

A computer network resource monitoring and locating system includes one or more hierarchical management information bases (HMIBs) through which a user can locate or obtain information relevant to managing or locating various network resources. The system maintains a portion of the HMIB information on each node, and a user starts from a local node and navigates through the system using the contact information that is part of the HMIBs. Each network node provides information directly to an associated lowest level MIB, referred to herein as a group MIB, and maintains a copy of that MIB. The system condenses the information in the gossip MIB and provides the condensed information as a row of a next highest level MIB, which is referred to herein as a subnetwork MIB. The system further condenses the information in this MIB to produce a row of a next highest level MIB, and so forth. Each row of the MIBs includes an identifier that identifies the source of the information, and contact information for at least a non-empty subset of the associated nodes. Each node maintains a view of each group MIB to which it has supplied information. The node also maintains views of each of the higher level MIBs that link the node to the highest or root level MIB, which contains condensed information of interest about every participating node. A user can obtain, through the contact information in the root MIBs maintained by the nodes, a point of contact for more detailed information about any participating node, such as, for example, the nodes in other subnetworks, and so forth. The system uses a hierarchical gossiping scheme to send gossip messages through contact nodes of various levels, to ensure that each node uses up-to-date information. Each node may also send broadcast and non-broadcast gossip messages to other nodes in the network. The gossiped information thus propagates through the network, using parallel routes and including in the message uncondensed information about only a portion of the nodes and condensed information about the remainder of the nodes in the network.

35 Claims, 6 Drawing Sheets

SCALABLE COMPUTER NETWORK RESOURCE MONITORING AND LOCATION SYSTEM

FIELD OF INVENTION

The invention relates to distributed computer systems and more particularly to a mechanism for sharing information across the distributed system.

BACKGROUND OF THE INVENTION

Information is shared across distributed systems, or networks, generally by either a messaging scheme or a shared virtual memory mechanism. The messaging schemes typically require that the system nodes maintain up-to-date topology information. Further, the nodes must exchange certain specific series of messages to convey desired information between the nodes, and may require that the nodes send queries to determine, for example, if any changes in status have occurred. The messaging schemes are thus relatively difficult to use for certain applications. Also, if one or more of the nodes fail, the messaging schemes may become unreliable.

The shared memory systems do not scale well, since they require the nodes to coordinate their shared memory activities across the network. Accordingly, the complexity of these systems increases as the number of nodes increases.

As discussed in co-pending U.S. patent application, Ser. No. 09/335,955 entitled DISTRIBUTED PROCESSING SYSTEM WITH REPLICATED MANAGEMENT INFORMATION BASIS, which is assigned to a common assignee and is incorporated herein by reference, now U.S. Pat. No. 6,411,967, information may be efficiently provided over a distributed system using a replicated management information base (RMIB), or replicated spreadsheet, which includes columns, or categories, of information to be shared among "member" nodes and a row for each member node. Such a system scales well and uses a gossiping scheme to ensure that updated information reaches all of the member nodes. The invention discussed below is a system and a method of operating the system that improves upon the teachings of the RMIB system, to improve the scalablity of the system.

SUMMARY OF THE INVENTION

The invention is a computer network resource monitoring and location system that includes one or more hierarchical management information bases (HMIBs) through which a user can readily locate or obtain information relevant to locating and managing various network resources. The system maintains a portion of the HMIB information on each node, and a user navigates through the system starting from a local node and using contact information that is contained in the HMIBs.

More specifically, a node that belongs to a multiple-node domain, for example, a group, provides information of interest as a row of a group management information base or group MIB. The group MIB, which is in the form of a table, has columns for the different types of information of interest and includes at least (a) a node ID column for a node identifier that uniquely identifies the node that is the source of the information, and (b) a contact column for a node address and, as appropriate, other relevant contact information. Each node that supplies information to the group MIB is a member of that MIB, and each member maintains a view of the group MIB.

In systems with two or more levels, each group is a member of, for example, a multiple-group subnetwork. The system provides, to each of the nodes in the subnetwork, condensed versions of the group MIBs of each of the member groups. Each condensed version becomes a row of a subnetwork MIB, with the row including at least a group identifier that uniquely identifies the group and contact information for a subset of the nodes in the group. The condensed version may also include such information as the average or the median load on the nodes in a group, what resources are operating within the group, and so forth.

The system, in turn, provides condensed versions of the subnetwork MIBs to a next level MIB, which in the example is a multiple-subnetwork MIB. The condensed information is included as the rows of the next level MIB, with each row containing contact information for a subset of the associated nodes. The system provides condensed versions of these next level MIBs as the rows of a higher level MIB, and so forth, until the condensed versions of the relevant information are supplied to a root MIB, which in the example is a network MIB.

Each node maintains a view of each group MIB of which it is a member and also a copy of each MIB in a link from the node to the associated root, or network, MIB. Each node thus stores a portion of the HMIB information, and provides contacts through which a user can access further information about every other node in the network. For example, any node that has a copy of the network MIB can, through contact information in that MIB, direct a user to various nodes in the same or other subnetworks that have information about particular resources of interest. The user can then descend through the hierarchy of MIBs maintained by these other nodes to determine which particular nodes are operating the resources of interest. Accordingly, the local node uses the HMIB to direct the user ultimately to a node that has or is running a resource of interest, and the local node thus does not have to maintain detailed information about each of the other nodes in the network.

The system may also use a hierarchical gossiping protocol to ensure that each node receives updated information for its views of the MIBs, as discussed in more detail below. Also as discussed below, the system may employ a cryptographic scheme to prevent an interloper from corrupting the HMIB information.

BRIEF DESCRIPTION OF THE DRAWINGS

The invention description below refers to the accompanying drawings, of which.

DETAILED DESCRIPTION OF AN ILLUSTRATIVE EMBODIMENT

A. The Hierarchical Management Information Bases

Figure 1:
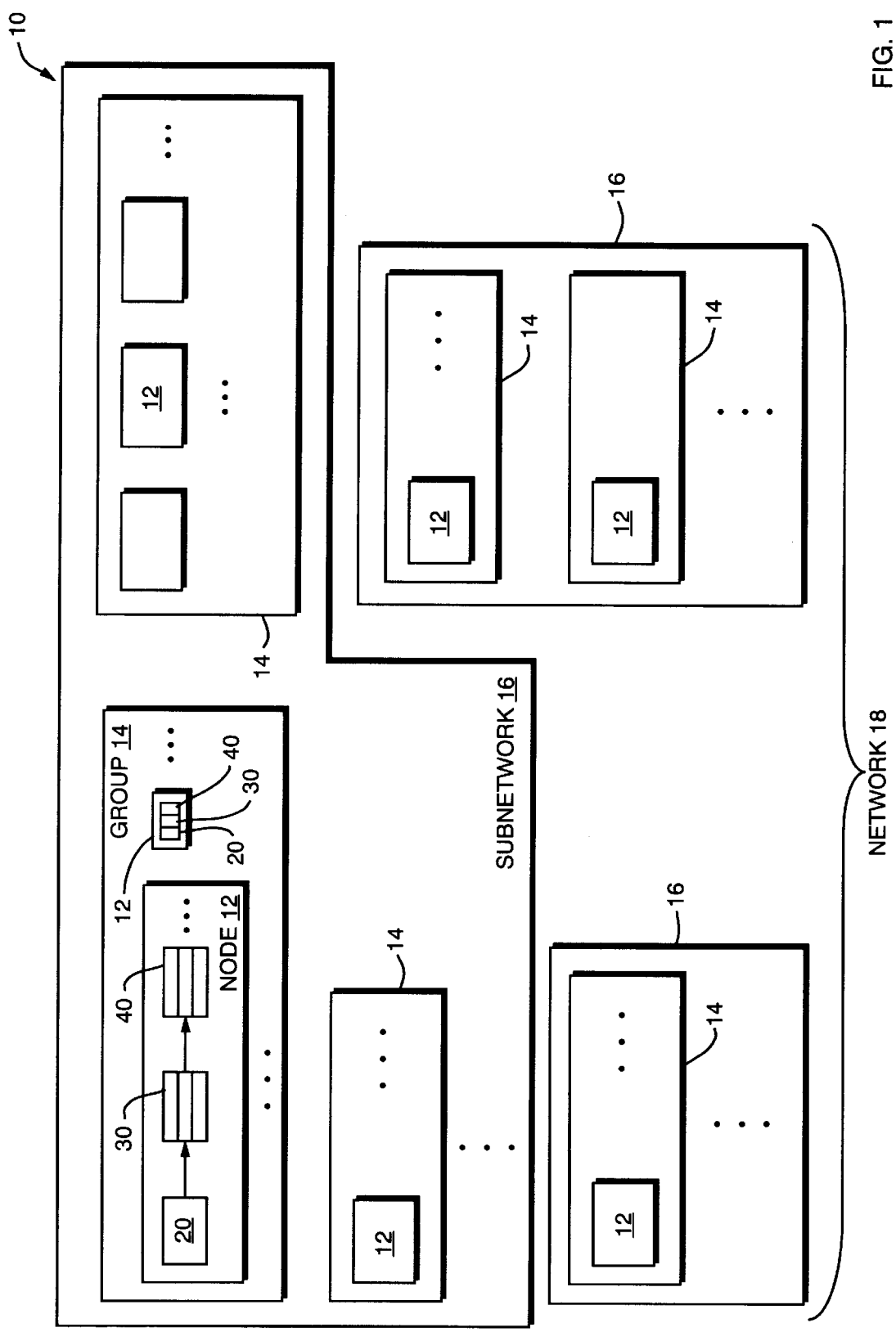
FIG. 1 is a functional block diagram of a system constructed in accordance with the invention.

A computer system 10 includes a plurality of nodes 12 that operate in groups 14, with a number of groups operating in various subnetworks 16, and a number of subnetworks operating as one or more networks 18. Each network 18 supports at least one hierarchical management information base (HMIB), which is essentially a tree of two-dimensional tables 20, 30, 40, that allows a user to navigate through the network 18 to various resources of interest.

Figure 2A:
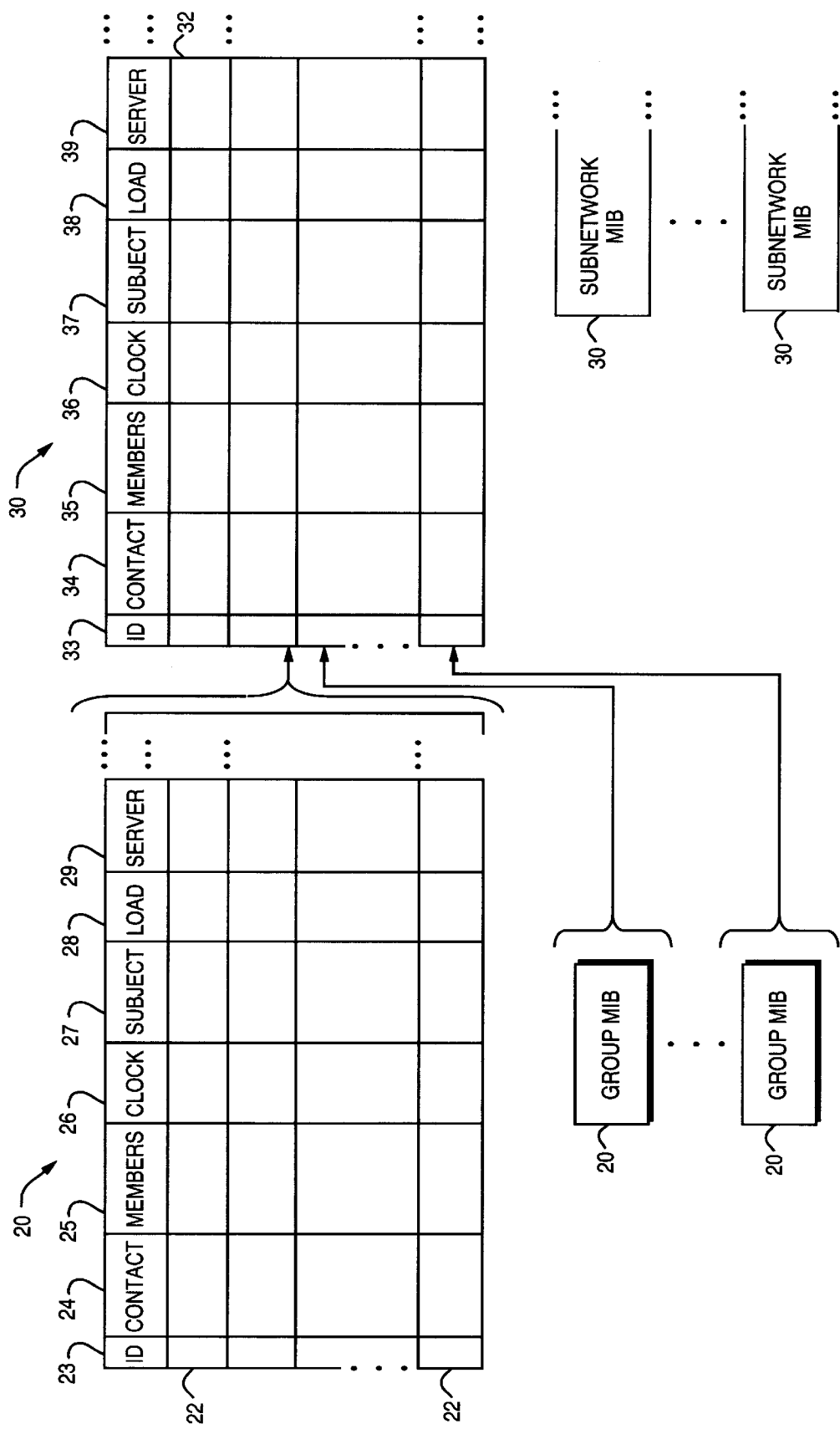
FIGS. 2A, 2B illustrates in more detail the HMIB system of FIG. 1.

Referring also to FIG. 2A, the nodes 12 each supply to a group table or MIB 20 information of interest, such as current load, type of operating system, whether or not a particular server or other resource is running on the node and so forth. The group table or G-MIB has a row 22 for each member node 12 and columns 24, 26 . . . for the various categories of information of interest. The G-MIB contains at least an ID column 24 and a contact column 26. Each row of the ID column 24 contains an identifier that uniquely identifies the node that is the source of the row information. Each row of the contact column 26 contains an address and other relevant information required for contacting the node. The contact column entry in the G-MIB may contain, for example, a node address and an indication of the appropriate transport protocol. Each row of the G-MIB also contains a time stamp entry in a clock column 23 that is used to coordinate row updates, as discussed in more detail below. In the drawing, the G-MIB further includes a column 28 for load and a column 29 that indicates if a particular server is running on the node. As discussed in more detail below, each node 12 is responsible for the contents of its own row 22 in the G-MIB 20. When the node updates its row, the update propagates to the other network nodes through hierarchical gossiping, as discussed in more detail in Section B.

Every node in the group maintains a view, or copy, of each G-MIB of which it is a member. A node may be a member of more than one group and the node thus maintains more than one G-MIB. If the system uses only one level, in the example the group level, the system may operate in the same manner as the replicated management information base system discussed in co-pending application Ser. No. 09/335,955 entitled DISTRIBUTED PROCESSING SYSTEM WITH REPLICATED MANAGEMENT INFORMATION BASIS, which is assigned to the same assignee and is incorporated herein by reference now U.S. Pat. No. 6,411,967. In the example below one HMIB is discussed. However, a given node may be member of multiple HMIBs.

Referring still to FIG. 2A, if the system uses further hierarchical levels, the information in the group table or G-MIB 20 is condensed, using a set of "condensation functions" as discussed below, to become a row 32 of, for example, an associated subnetwork MIB 30. The subnetwork MIB or S-MIB 30 has a row 32 for each associated group and columns 34, 36 . . . for the condensed information of interest. The condensed information may be, for example, the average load on nodes in the group, what particular resources are operating on one or more of the nodes in the group, and so forth. Each row of an ID column 34 contains a group identifier that identifies the source of the row information, and each row of a contact column 36 contains the address information for a subset of the nodes in the associated group. The contact column 36 in the S-MIB may, for example, include the contact information for the first two or three nodes listed in the associated G-MIB. Alternatively, the contact column of the S-MIB may include the contact information for a partial list of the nodes.

Each node in the subnetwork maintains a view of the associated S-MIB, as well as the view of the G-MIB of which it is a member. The S-MIB 30 provides to a user who is looking for a particular resource sufficient information to determine which group to go to for access to the resource. The user then uses the contact information in the S-MIB to contact a node in the latter group, and the contacted node determines which particular node in the group can provide the user access to the resource of interest. A user can thus readily obtain a desired level of information about any node in the subnetwork by descending through the hierarchical MIBs.

Figure 2B:
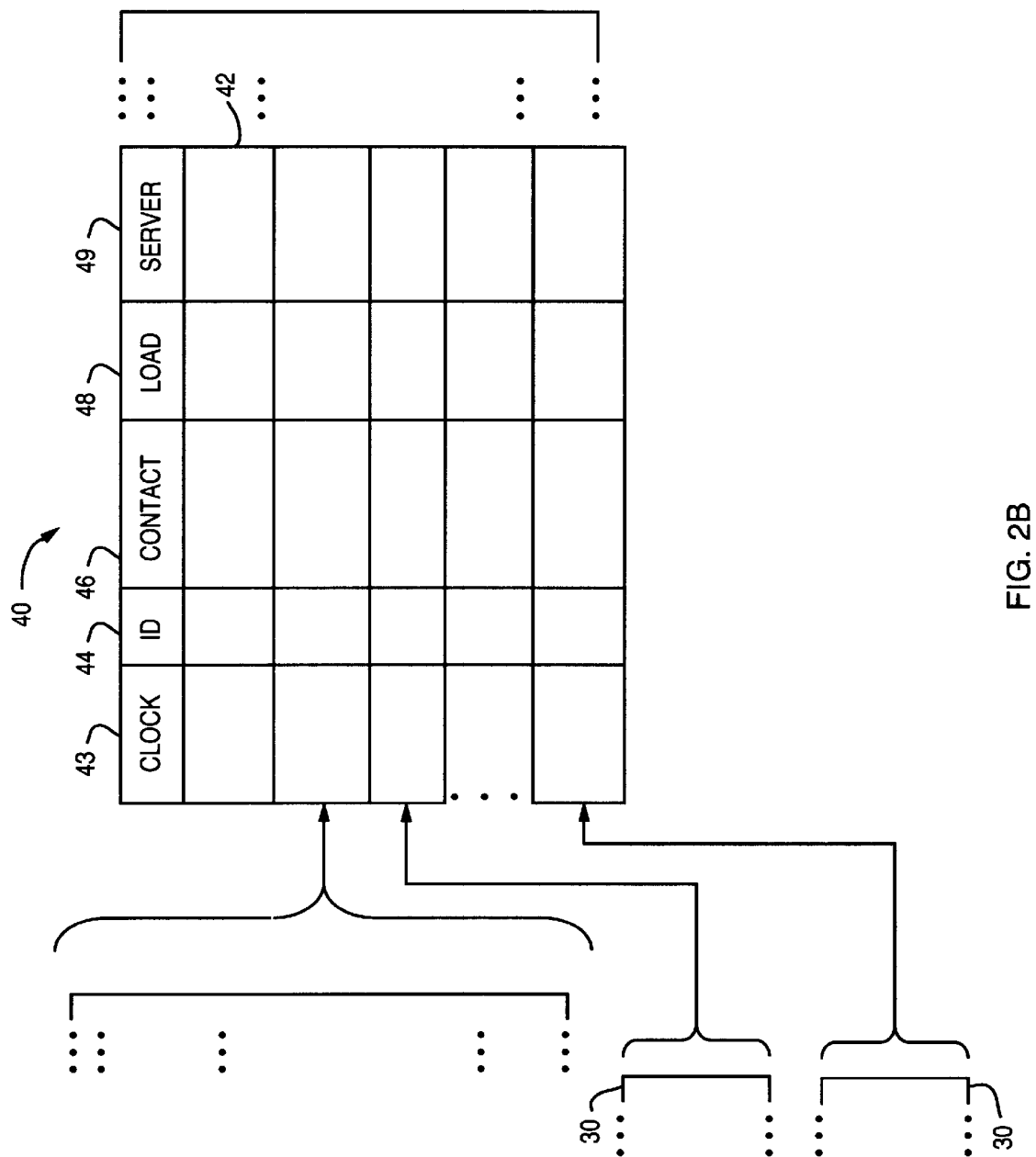

For the next higher level, the information in the S-MIB is condensed using the same or a different set of condensation functions and the condensed version is then supplied as a row 42 (FIG. 2B) of a network MIB or N-MIB 40. The N-MIB includes in each row an identifier that uniquely identifies the associated subnetwork and contact information for a subset of the nodes in that subnetwork. A user can thus readily navigate through the HMIB from the lowest level to the top or root level and back, to obtain more detailed information about what resources are available in any of the subnetworks, groups, and so forth. In the example, the user locates a particular server by determining which subnetwork is running the server from the information in the view of the N-MIB maintained by the local node. Then, using the contact information contained therein, the user contacts a node in the appropriate S-MIB and through that MIB contacts a node in the group that is operating the resource. Finally, using the contact information in the G-MIB that is maintained by the contacted node, the user contacts the particular node that is operating the server of interest. Alternatively, the system may use the HMIB to direct a user's search request from a local node to the appropriate network node, without requiring that the local node specify the location of the server. For example, the system may direct requests from users in a particular group to a specific node in the same group that is operating the server, or it may direct the requests to a server on a different node in the same or a different group that is then relatively lightly loaded.

The condensation functions discussed above may reside with the tables that hold the information supplied to the functions. Thus, the condensation functions associated with the G-MIB operate on the information supplied to the G-MIB by the member nodes, and then supply the condensed results to the next higher level MIB. For example, one condensation function associated with the G-MIB may take the average of the load values in the load column 28 (FIG. 2A), to produce the average load value for the column 38 in the associated row 32 of the S-MIB 30. The condensation function may instead produce the median load value, the maximum load value, the minimum load value or some other value of interest. Another condensation function may, for example, produce a "true" value for a resource column 39 if at least one entry in the corresponding column 29 of the G-MIB is true. In the example, this condensation function produces a true value in the resource column 39 to indicate that at least one of the associated nodes is running the server process. In the example, there is no need to indicate in the S-MIB how many of the servers are operating within the group. If an application later requires such information, however, the system can update the condensation function to provide the information to the S-MIB, as discussed below. The condensation function thus produces, from the entries in a given column of the G-MIB, a value for the S-MIB that conveys sufficient information for a user or the system manager to determine if any nodes in the associated group are of interest.

B. Updating the HMIBs

When a node updates its row of the G-MIB, the updated information propagates through the network by "hierarchical gossiping" as discussed below. Each node that receives the updated G-MIB row information updates the corresponding row in its view of the G-MIB and, as appropriate, the associated rows of its view of the S-MIB, the N-MIB and so forth, using the applicable condensation functions. The updating of the row information in the G-MIB is preferably performed in the same manner as the updating of the rows of the replicated management information bases, as discussed in the co-pending application that is incorporated herein by reference.

Figure 3:
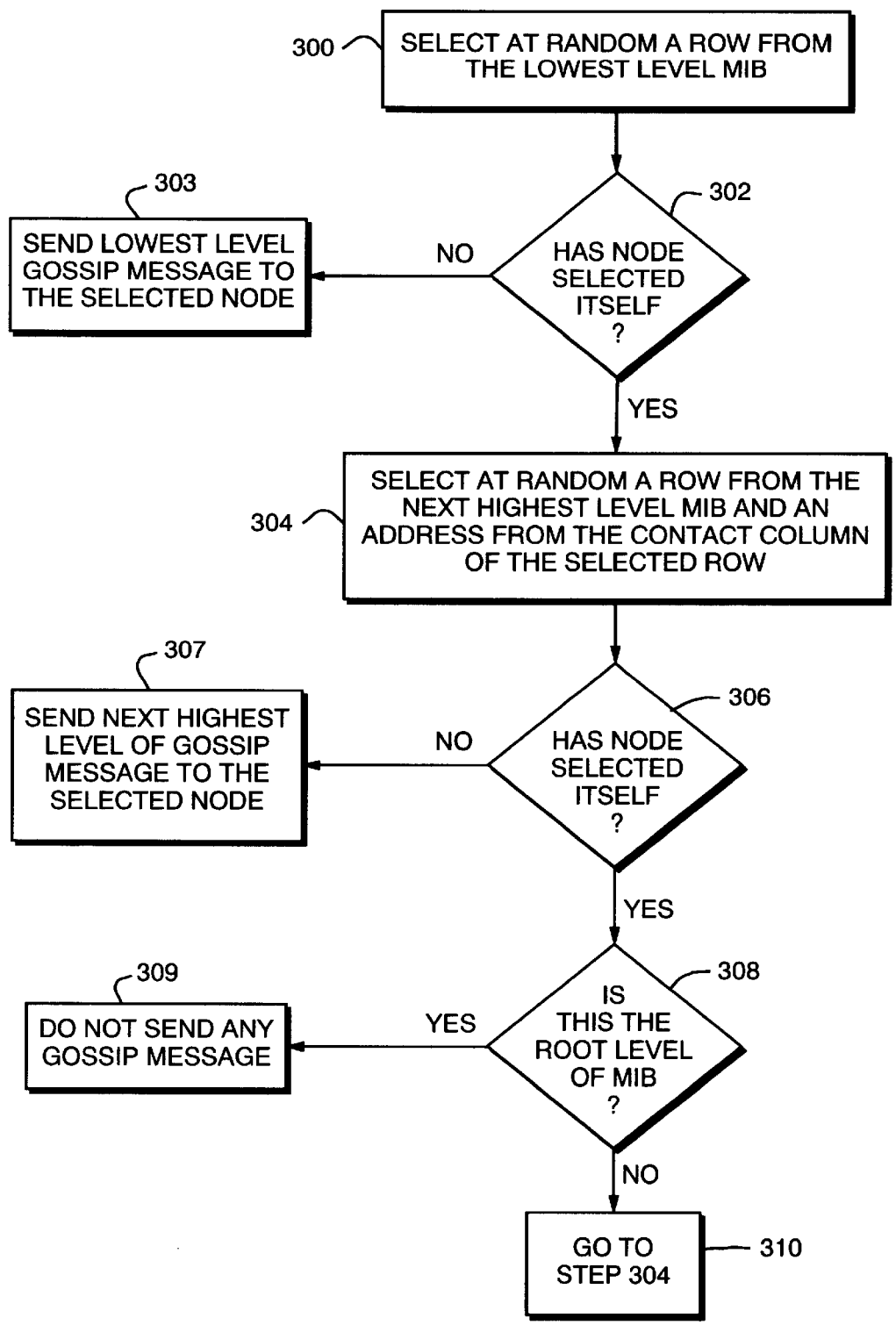
FIG. 3 is a flow chart of the hierarchical gossiping operations.

Referring now to FIG. 3, the nodes periodically "gossip" about the updates, both locally and hierarchically, to ensure that each node is using the most up-to-date information in its MIBs. In every gossip interval, a member node selects a row at random from the MIB of which it is a member, in the example, from the G-MIB, and sends to the node identified therein the contents of the identifier columns and the associated clock columns from every row of every MIB stored at the gossiping node. The node also updates the clock column in its own row to the time at which the gossip message was sent and, as necessary, updates the associated entry in the clock column in each of the higher level MIBs with the median clock values from the next lower level MIB (steps 300–302). If the node selects itself from the G-MIB, however, the node instead selects a row at random from the S-MIB and also selects an address at random from the contact information contained in the selected row (step 304). The gossiping node then sends the identifier and clock columns from the S-MIB and each higher level MIB to the node that corresponds to the selected contact information (steps 306–307). The higher level gossip message sent to the node selected from the S-MIB thus does not include information from the lower level G-MIBs. Accordingly, the message is shorter than the lower level gossip message sent to a node that is a member of the same G-MIB.

If the node again selects itself from the S-MIB, the node enters the next higher level MIB and uses the contact information therein to determine where to send a higher level gossip message. If the node has not selected itself, the node sends to the selected node a gossip message that includes information from the current level MIB and the higher level MIBs. Otherwise, the node enters the next highest level MIB and so forth. If the node ultimately selects itself from the root MIB, which in the example is the N-MIB, the node refrains from sending a gossip message (steps 308–310).

In response to a gossip message, the receiving node determines, based on the clock column entries in the gossip message, if it has more up-to-date information in its views of the MIBs referenced in the message. If so, the node returns updated rows to the gossiping node, and the gossiping node then updates its tables accordingly.

While most gossip messages are sent locally, that is, within the group, a small number of messages are sent outside the group to nodes that are in the same subnetwork, the same network, and so forth. The subnetwork and higher levels, however, receive gossip messages from each of their member groups, and thus, there are sufficient numbers of gossip messages sent through the subnetwork and higher level contacts to ensure that the updated information propagates along essentially parallel routes through the various levels. Accordingly, the update information propagates through the entire network with relatively high probability, even if a number of nodes fail or are removed from the network.

The hierarchical gossiping mechanism scales well, since the gossip messages are sent over the network in parallel routes, and each message contains uncondensed information about only a portion of the network and condensed information about the remainder of the network. In contrast, flat or non-hierarchical gossiping systems do not scale well because with larger numbers of nodes these systems produce longer gossip messages and send the messages along essentially one route through the network. The messages may thus cause congestion. Further, the gossip messages may become prohibitively long, since they contain uncondensed information about every node in the network. While the hierarchical gossiping mechanism scales well, it does require more gossip rounds than the non-hierarchical gossiping to propagate the update information over the entire network.

Based on the testing and analysis of the hierarchical gossiping systems, the most efficiently scalable systems are those in which the number of nodes per "domain" is equal to the number of domains, that is, those in which the average number of nodes per domain is minimized. If there are n nodes per domain and m levels, the system supports $n^m$ participating nodes and the gossip messages across the various levels are of minimal size, with lowest level gossip messages including uncondensed information about n nodes and condensed information about the remaining nodes $n^{m-n}$ nodes. If non-hierarchical gossiping were instead used, each gossip message would include uncondensed information about each of the $n^m$ nodes.

C. Updating the Membership of the HMIBs

In large distributed systems it is expected that nodes will be joining and leaving the network, or recovering and failing, at a relatively high rate. To detect failed nodes, or nodes that are no longer participating, the nodes use the time-stamp entries in the clock columns 23, 33, 43 (FIG. 2A). As discussed above, a node updates its clock column entry in the G-MIB each time it sends a gossip message. The clock column in the higher level MIBs are also updated, as necessary, with entries that are the median clock values from the next lower level of MIB.

Each node removes from its MIBs those rows that have time stamps that are lower than the current time by more than a predetermined amount. In this way, failed or non-participating nodes are removed, as are empty groups, subnetworks and so forth. The predetermined amount of time for failure detection is chosen as the estimated time it takes for an update to propagate through the system with high probability. If it takes "r" rounds for an update to propagate fully with some predetermined high probability using hierarchical gossiping, the predetermined amount of time is preferably selected to be $r * t_{gossip}$, where $t_{gossip}$ is the length of a gossip interval.

To accommodate recovering nodes and/or new nodes, the system provides a broadcasting mechanism that allows these nodes to obtain up-to-date MIBs. A new or recovering node need only know its own identifier and the identifier of the nodes on the path to the root node. The new and recovering nodes then learn about their G-MIB and the other MIBs of interest through gossiping.

Figure 4:
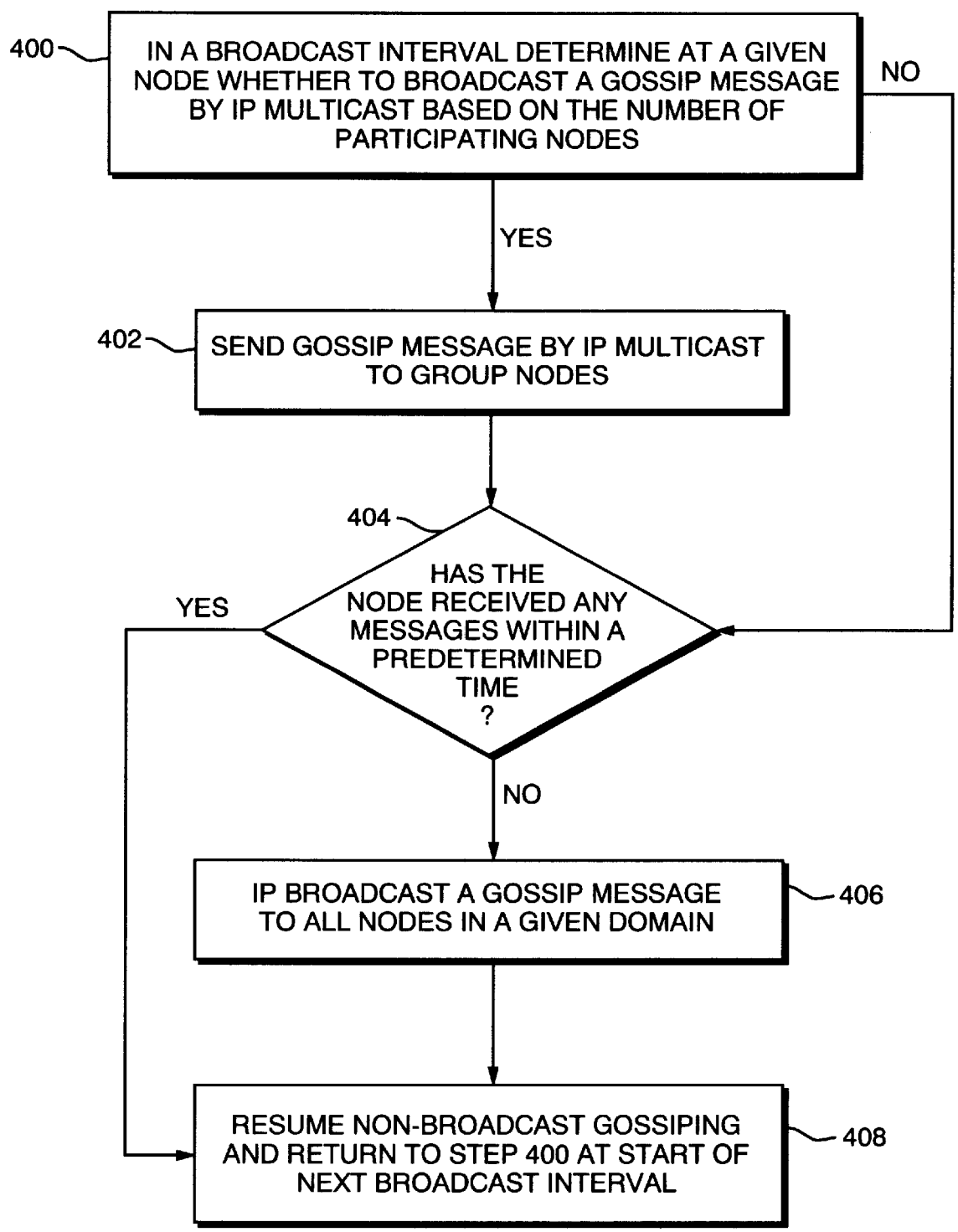
FIG. 4 is a flow chart of the operations of a node sending gossip messages during a broadcast interval.

Referring now to FIG. 4, each MIB in the HMIB has a members column that includes as entries counts of the member nodes in the associated lower levels. At predetermined broadcast intervals, each node determines if it is to send a broadcast gossip message using IP multicast. To determine if it should broadcast a gossip message in a given interval the node uses an average that is weighted by 1/n where is the total number of member nodes, or, in essence, tosses a weighted coin (steps 400, 402). Further, if the node has not received any messages for some predetermined time, the node also sends its gossip message by IP broadcast to the nodes that are members of the local subnetwork (steps 404, 406). This second type of broadcast gossiping is particularly useful in systems in which not all of the nodes support IP multicast. Further, both types of broadcast gossiping are useful for updating the new and recovering nodes, which are not yet known to the other nodes and thus not selected as recipients of non-broadcast gossip messages.

Figure 5:
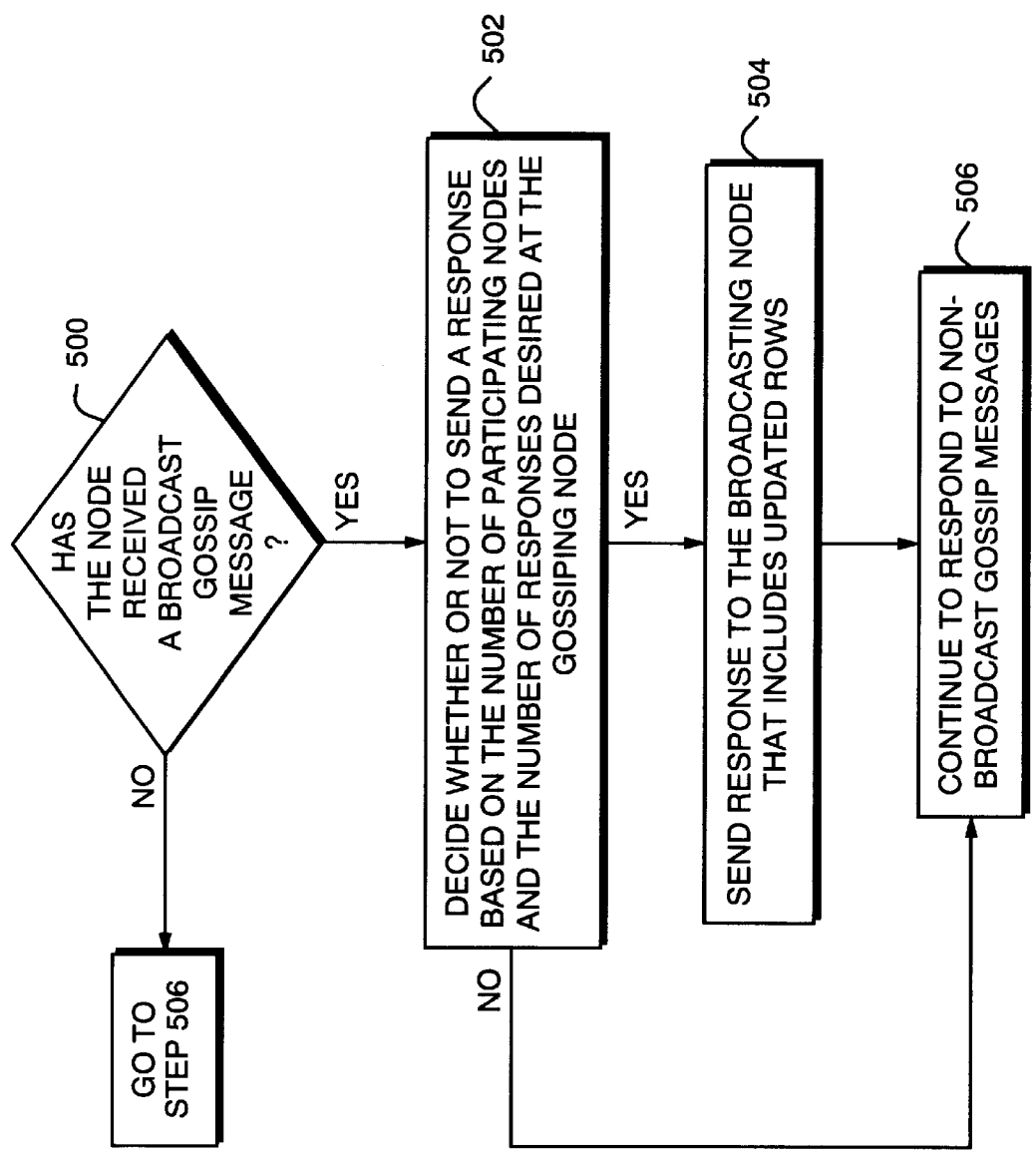
FIG. 5 is a flow chart of the operations of a node receiving gossip messages during a broadcast interval.

Referring also to FIG. 5, when a node receives a broadcast gossip message, the receiving node determines if it should respond by using an average that is weighted by P/n where n is the number of members and p is selected to be the desired number of responses to be received by each of the gossiping nodes (steps 500, 502). In the exemplary system, p is chosen to be three. If the node is to respond, it sends to the broadcasting node all of the updated rows (step 504).

After the gossiping node receives the responses and, as appropriate, updates its MIBs, it periodically sends non-broadcast gossip messages to selected nodes (step 408), and responds appropriately to any received non-broadcast gossip messages (step 506). The hierarchical gossiping system, using both broadcast and non-broadcast messaging schemes, ensures, with a high probability, that all of the nodes associated with the HMIB have essentially up-to-date information.

The condensation functions may be updated in the same manner as the other MIB information. Each MIB may, for example, include an entry that identifies the version of the set of condensation functions used to produce the rows of the next higher level MIB. When the set is replaced with a next version, the nodes use the new functions to produce the corresponding rows of the next higher level MIB.

D. Security of the HMIBs

For certain applications, the system may be made relatively secure using public key certificates in place of the MIB identifiers. This type of security should inhibit an interloper from spreading invalid updates to existing MIBs or generating false MIBs.

Each MIB is assigned a public/private key pair. The private key is given to all nodes that store the MIB, and the nodes use the key to sign the updates of the MIB. The update message then contains an associated authentication certificate that includes the MIB identifier and the corresponding public key, and is signed by a certification authority with a well-known public key.

When a node receives an update for a particular MIB, the node checks that the included certificate is correctly signed by the certification authority and that the update is correctly signed in accordance with the public key contained in the certificate. If the update is valid, the node uses the information contained therein to update the appropriate entries in the MIB. This mechanism ensures that only those nodes that maintain that MIB can update the MIB, since only those nodes have the private key required to sign the updates.

With access to the private key, each node has authority to update the root MIB. Accordingly, if the security of a given node is compromised, an interloper can falsely update the root MIB, and thus, adversely affect the entire system. To avoid this situation, the system may require that any higher-level any MIB update be signed by some number of member nodes. A single compromised node, or even a small group of compromised nodes, could not then propagate false update information.

Alternatively, the system could provide the private keys to only selected nodes, that is, to only the most secure nodes. While each node could then update its own row of the G-MIB, and gossip about the updates to other MIBs, only the nodes with the private keys can sign the updates that affect the higher level MIBs. These key holder nodes thus control the updating of the higher level MIBs at those nodes that are members of, for example, the same subnetwork, but are not members of the same group. The private keys are associated with each of the rows of the higher level MIBs, and thus, selected members of the various lower levels control the updating of various rows of the higher level MIBs.

The system may be further protected from interlopers by use of condensation functions that produce valid results even with a small percentage of incorrect input information. For example, the system may calculate the median load on the nodes in a group rather than the average load. This essentially eliminates the adverse effects of incorrect load information from a compromised node, particularly if the information differs substantially from the actual load value.

E. Message Compression

When long byte strings are involved in, for example, the HMIB updates, the system reduces bandwidth by compressing the strings. Specifically, strings longer than a predetermined length, for example, sixteen bytes, are converted by a cryptographic, one-way hash function to shorter fixed-length strings, or hash codes. The recipient of an update message uses the incoming hash code to enter a translation map and recover the plaintext long string.

If the recipient's translation map does not include an entry corresponding to the hash code, the recipient ignores the update message and returns to the sender a message requesting the missing plaintext value. If the sender of the update message still has the value in its translation map, it returns the long byte string. The recipient then hashes the plaintext string and makes a corresponding entry in its translation map.

With hash functions, more than one string of bytes may encode to the same hash code. Accordingly, it is important to use a hash function that has a low probability of producing the same hash code for more than one byte string of interest.

The message compression protocol is particularly effective for long-lived string values, such as public key certificates. The encoding of such long values prevents an intruder from reconstructing a value from its corresponding hash code, and thus, reduces the need to change the key certificates to avoid any compromise of the system.

A node may updates its translation map by periodically removing from the map information for which there is no reference in the node's MIBs. Accordingly, the node removes hash code entries for particular long byte strings when the strings are no longer contained in the MIBs. Alternatively, the maps may be updated by removing the entries whenever the size of the map exceeds a predetermined maximum level.

F. Application-Level Routing

The system described herein facilitates a novel implementation of the well-known publish/subscribe pattern, in which publisher processes transmit to the subscribers messages relating to various subjects, for example, financial information about a particular business entity. For this implementation, the HMIBs each include a subject column. On the lowest level, processes declare in this column which subjects are of interest to them. The values of "subject" in each of the higher level tables are then constructed by a condensation function that takes the union of the subject values in subject column of the next lower level table. Thus, the HMIB accurately reports which subjects are of interest in each domain.

A user-level routing protocol for messages uses this information to route messages to domains where there is an interest in the corresponding subjects. These messages are then delivered in the domain to the subscriber processes that have declared interest in the corresponding subjects. To declare their interest, the subscriber processes may use "wild cards," that is, expressions that match a variety of subjects. For example, the wild card "M*" might designate all subjects that start with the letter M. The user-level routing protocol then directs all messages that cover subject matter starting with the letter M to the appropriate domain.

In the case of a message multicast protocol, such as the gossiping used in the system described herein, the gossip messages can each be similarly directed to selected nodes that have an interest in the particular gossiped information. This avoids the sending of unnecessary gossip messages. The system may use the directed gossip messages to detect missing messages, and thus, further control message re-broadcasting.

The HMIB described above may be used for cluster management. It may thus be used to, for example, run resources in groups and on nodes that are relatively lightly loaded. Alternatively, the HMIBs may be used for application-level routing as discussed above. Further, the HMIB may be used to provide reliable multi-casting by including in the MIBs a column that depicts the sequence number of the last message the nodes received in order. The system can then determine which nodes, groups and so forth did not receive a particular message and rebroadcast the message over the appropriate domain. The HMIB may also be put to other uses that require providing information to or managing information about the nodes of a distributed system.

A given node may be a member of a number of groups, and of multiple HMIBs. The HMIBs denote logical domains or groupings of nodes, based on information or resources to be shared, rather than physical configurations or groupings of the nodes.

What is claimed is:

1. A system for communicating information among nodes of a network, the system including:
   A. a lowest level of management information data base with columns containing information to be shared directly among a plurality of nodes and a row for each of the nodes that is to directly share the information, the nodes being members and each member maintaining a view of the lowest level data base;
   B. one or more higher levels of management information data bases, the higher levels of data bases with columns containing condensed versions of the contents of a plurality of the next lower level of data bases, and a row for each of the lower level data bases from which information was condensed, the nodes associated with the condensed information each maintaining a view of the corresponding one or more higher levels of management information data bases; and
   C. a condensing process for combining the information included in the lower level data bases to produce the rows of the higher level data bases, the condensing process including in each row contact information for a subset of the nodes associated with the lower level data base.

2. The system of claim 1 further including
   D. row updating means for updating the rows of the data bases, the row updating means allowing each member node to make changes to the corresponding row of the lowest level data base and each node that maintains a higher level data base to make corresponding changes to the rows of the higher level data bases; and
   E. a hierarchical gossip subsystem for providing gossip messages that indicate the rows to which the changes were made; and
   F. table updating means for updating the data bases to include updated information.

3. The system of claim 2 wherein the hierarchical gossip subsystem includes
   i. means for providing to a member of a given lowest level data base a gossip message that includes information which identifies the last changes made to each of the rows of the data bases at a gossiping node;
   ii. means for providing to a selected node that is associated with a higher level of data base a gossip message that includes information which identifies the last changes to each of the rows of the higher level of data base with which the selected node is associated and the last changes to the rows of the even higher levels of data bases maintained by the gossiping node; and
   iii. means for providing to the gossiping node changes that are included in the view of the data bases at the node that receives the associated gossip message but are not included in the view at the gossiping node.

4. The system of claim 3 further including
   G. a compression process for compressing long byte string values to shorter string values, and including the shorter values in place of the long byte string values, and
   H. a translation map for reproducing the long byte string values from the shorter string values.

5. The system of claim 4 further including a means for requesting a missing translation map entry from a node that includes the associated shorter string value in an update message.

6. The system of claim 5 wherein the compression process uses a hash function.

7. The system of claim 3 further including in the hierarchical gossip subsystem, a means for including in the gossip messages information that identifies the version of the gossip message.

8. The system of claim 7 wherein the information that identifies the version is a time stamp.

9. The system of claim 8 further including means for removing from the management information bases information relating to nodes that do not send gossip messages within a predetermined maximum time limit.

10. The system of claim 1 wherein the condensing means includes in each row of the higher level data bases an identifier that identifies the lower level data bases associated with the condensed information.

11. The system of claim 10 wherein the identifier is a public key.

12. The system of claim 11 wherein the row updating means
   i. at an updating node signs each update of a higher level data base with a private key, and
   ii. at a node receiving the update information checks the information with an associated public key to determine if the information is authentic before updating the corresponding rows of the associated higher level data base.

13. The system of claim 10 wherein the identifier is a public key certificate.

14. The system of claim 13 wherein
  i. the row update means signs each update of a higher level data base with a private key and includes in the update an authentication certificate,
  ii. the update means authenticates the signature using the public key associated with the authentication certificate and authenticates the update using the public key contained in the authentication certificate.

15. The system of claim 1 wherein
  a. the lowest level of management information data base includes information denoting, for each node, message subject matter that is of interest to the node, and
  b. the higher levels of management information data bases include information denoting for each lower level database message subject matter to direct to the associated nodes.

16. The system of claim 15 further including means for using the data bases to route a given message to the nodes that have indicated that the subject matter of the message is of interest.

17. The system of claim 16 wherein the hierarchical gossip subsystem further includes means for routing a given gossip message to the selected node to which the subject matter of the gossip message is of interest.

18. The system of claim 1 wherein the condensing process takes the average of entries in certain columns of the lowest and higher levels of data bases.

19. The system of claim 1 wherein the condensing process takes the median of the entries in certain columns of the lowest and higher levels of data bases.

20. The system of claim 1 wherein the condensing process condenses into a single true or present indicator a column that includes one or more entries that indicate the subject matter referenced by the column is present in one or more of the associates nodes.

21. A method of providing information over a distributed system, the method including the steps of:
  A. each node providing to a lowest level of management information data base information to be shared among nodes and each node maintaining a view of the associated lowest level of data base;
  B. producing one or more higher levels of management information data bases each containing condensed information from a plurality of the next lower level of data bases, the higher levels of data bases containing a row for each of the lower level data bases from which the information was condensed and including in each row contact information for a selected number of the nodes that are associated with the condensed information contained in that row, the nodes each maintaining a view of each of the one or more higher levels of management information data bases with which they are associated;
  C. updating the rows of the lowest and higher levels of data base with updated information provided by the respective nodes;
  D. providing the updated information to the nodes that maintain views of the data bases.

22. The method of claim 21 wherein the step of providing updated information further includes gossiping about the updated information to selected nodes associated with the various levels of the data bases.

23. The method of claim 22 wherein the step of gossiping includes:
  i. at a given node selecting from the lowest level of data base a node to which to send a lowest level of gossip message;
  ii. if the given node does not select itself from the lowest level of data base, sending the lowest level of gossip message to the selected node;
  iii. if the given node selects itself, selecting from a next higher level of data base a node to which to send a next higher level of gossip message;
  iv. if the given node does not select itself from the next higher level of data base, sending the next higher level of gossip message to the selected node;
  v. if the given node selects itself from the next higher level of data base repeating steps iii-iv until either the node selects another node to which to send the corresponding higher level gossip message or the node selects itself from the highest level of data base and refrains from gossiping.

24. The method of claim 23 wherein the step of gossiping further includes broadcasting from a given node at controlled intervals broadcast gossip messages.

25. The method of claim 24 wherein the step of gossiping further includes responding to the broadcast gossip messages at controlled rates.

26. The method of claim 23 wherein the step of gossiping further includes broadcasting a gossip message from a given node to the nodes that are associated with a given level of data base.

27. The method of claim 26 wherein the step of gossiping further includes responding to the broadcast gossip messages at controlled rates.

28. The method of claim 21 wherein the step of updating the rows includes
  i. replacing long strings with associated hash codes in messages containing update information; and
  ii. at a given nodes receiving the messages, using a translation map to reproduce the long strings from the hash codes included in the messages.

29. The method of claim 28 wherein the step of updating the rows further includes, at a node receiving the messages.
  iii. ignoring a message that includes a hash code that is not contained in the translation map,
  iv. returning to the node that sent the message, a request for the long string value missing from the map, and
  v. updating the translation map with a hash code produced by hashing the received long string value.

30. The method of claim 23 further including determining which nodes are interested in the information included in a given gossip message, and sending the message to a selected one or more of the interested nodes.

31. The method of claim 21 wherein
  a. the step of each node providing information to a lowest level of management information data base includes providing to the data base information denoting one or more subjects of interest to the node, and
  b. the step of providing condensed information provides to a next higher level of management information data base a union of all of the subject information included in the associated lower level data base.

32. The method of claim 31 further including the step of routing a given message to the nodes that have an interest in the subject matter of the given message.

33. The method of claim 21 wherein the step of producing one or more higher levels of management information databases includes condensing the entries in lower levels of management information databases by taking the average of entries in certain columns of the lower level databases.

34. The method of claim 21 wherein the step of producing one or more higher levels of management information databases includes condensing the entries in lower levels of management information databases by taking the median of entries in certain columns of the lower level databases.

35. The method of claim 21 wherein the step of producing one or more higher levels of management information databases includes condensing the entries in lower levels of management information databases by condensing into a single true or present indicator entries in a given column of the lower level database that includes one or more entries that indicate the subject matter referenced by the column is present in one or more of the associated nodes.

* * * * *